United States Patent
Jeong

(10) Patent No.: US 7,853,287 B2
(45) Date of Patent: Dec. 14, 2010

(54) MOBILE COMMUNICATIONS TERMINAL AND METHOD FOR PREPAYING FOR COMMUNICATION CHARGE IN MOBILE COMMUNICATIONS TERMINAL

(75) Inventor: Yi-Seon Jeong, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1034 days.

(21) Appl. No.: 11/414,036

(22) Filed: Apr. 27, 2006

(65) Prior Publication Data

US 2006/0246870 A1    Nov. 2, 2006

(30) Foreign Application Priority Data

Apr. 28, 2005    (KR) ...................... 10-2005-0035694

(51) Int. Cl.
*H04M 1/00*    (2006.01)
(52) U.S. Cl. .................... 455/550.1; 455/407; 455/406; 379/114.01
(58) Field of Classification Search ................. 455/406, 455/550.1, 407; 379/114.01
See application file for complete search history.

(56) References Cited

U.S. PATENT DOCUMENTS

| | | |
|---|---|---|
| 2002/0193093 A1 | 12/2002 | Henrikson |
| 2003/0014367 A1 | 1/2003 | Tubinis |
| 2004/0009760 A1 | 1/2004 | Laybourn et al. |
| 2004/0106393 A1* | 6/2004 | Chowdhury et al. ........ 455/406 |
| 2004/0172362 A1 | 9/2004 | Hausmann et al. |

FOREIGN PATENT DOCUMENTS

| | | |
|---|---|---|
| DE | 197 19 002 A1 | 11/1997 |
| JP | 11239232 | 8/1999 |
| JP | 2002-374377 | 12/2002 |
| JP | 2003087439 | 3/2003 |
| WO | WO 99/18713 | 4/1991 |
| WO | WO 00/04701 | 1/2000 |
| WO | WO 02/51116 A1 | 6/2002 |
| WO | WO 03/079660 A1 | 9/2003 |
| WO | WO 2004/093424 A1 | 10/2004 |

* cited by examiner

*Primary Examiner*—Danh C Le
(74) *Attorney, Agent, or Firm*—Lee, Hong, Degerman, Kang & Waimey

(57) ABSTRACT

A mobile communication terminal and a method is provided to facilitate prepayment of a communication fee, whereby when a prepaid communication fee is depleted while using a mobile communication service, an alert signal and an announcement signal are generated and output, a channel occupied state is maintained and a hold condition is set to interrupt sending and receiving of communication signals, and in Internet connection is established to a selected financial institution to enable prepayment of an additional communication fee, thereby enabling continuous use of the ongoing mobile communication service.

21 Claims, 3 Drawing Sheets

MOBILE COMMUNICATIONS TERMINAL AND METHOD FOR PREPAYING FOR COMMUNICATION CHARGE IN MOBILE COMMUNICATIONS TERMINAL

CROSS-REFERENCE TO RELATED APPLICATIONS

Pursuant to 35 U.S.C. §119(a), this application claims the benefit of earlier filing date and right of priority to Korean Application No. 10-2005-0035694, filed on Apr. 28, 2005, the contents of which is hereby incorporated by reference herein in its entirety.

BACKGROUND OF THE INVENTION

1. Field of the Invention

The present invention relates to a prepayment of charges for a mobile communications terminal, and particularly, to a mobile communications terminal and method whereby communication charges are paid in advance without interrupting a call connection in an ongoing communication.

2. Description of the Related Art

A mobile communications system requires time and costs in order to install, operate and maintain facilities. A relatively large charge for using mobile communication services is imposed in the mobile communications system.

Generally, even if using a mobile communication service for which a large charge is incurred only when required, the payment on a monthly bill would often impose a heavy burden on a user or subscriber. In order to appropriately restrict large charges for using the mobile communication service, a prepaid communication charge (fee) system has been offered.

The prepaid communication charge system is used to make a subscriber of a mobile communication service prepay a certain portion of charges related to the mobile communication service, thereby allowing the subscriber to use the mobile communication service to the extent of the prepaid communication charge. However, the prepaid communication charge system has a disadvantage in that upon completely using up a prepaid communication charge, a certain service being used is terminated even while the subscriber communicates with another party.

Therefore, there is a need for a system whereby an ongoing mobile communication service may continue uninterrupted even when a prepaid communication charge is used up while facilitating payment of additional prepaid communication charges. The present invention addresses this and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An object of the present invention is to provide a mobile communications terminal and method which is capable of continuing an ongoing mobile communication service upon completely using up a prepaid communication charge by maintaining a communication channel presently occupied in a hold condition and then prepaying and charging an additional charge for communication to a selected financial institution through an Internet connection.

In one aspect of the present invention, a mobile communication terminal adapted to access a communication service is provided. The terminal includes a wireless unit adapted to send and receive payment information via an Internet connection, the payment information sent to a selected financial institution and related to a payment request and a payment permission for prepayment of charges for the communication service, and adapted to set and release a hold condition for a call connection state of a wireless communication channel allocated for the communication service, a memory unit adapted to record information related to the prepayment of the charges for the communication service, an alert unit adapted to generate an audio alert signal and/or an announcement signal to indicate a complete depletion of prepaid charges for the communication service and a control unit adapted to control and monitor the wireless unit and the memory unit in order to monitor prepayment, charging and subtracting of charges for the communication service, establish the Internet connection and set and release the hold state and adapted to control the alert unit to generate the audio alert signal and the announcement signal.

It is contemplated that the memory includes a Subscriber Identity Module (SIM) card. It is further contemplated that the memory is further adapted to record and update information related to prepaid charges for the communication service which have been accepted by the financial institution and charges related to previous use of the communication service.

It is contemplated that the memory unit is further adapted to record information related to a user's profile and information related to operation of a mobile communication system. It is further contemplated that the control unit is further adapted to control the wireless unit to maintain the call connection state of the communication channel during the hold condition while preventing sending and receiving of the communication signals.

It is contemplated that the alert unit includes a speaker adapted to output the communication signal and the audio alert signal under control of the control unit and a display adapted to output a message signal. It is further contemplated that the control unit is further adapted to control and monitor subtraction of charges for the communication service recorded in the memory unit in conjunction with a mobile switching center while the communication service is ongoing.

It is contemplated that the control unit is further adapted to determine whether the prepaid charges for the communication service have been completely depleted while the communication service is ongoing. It is further contemplated that the control unit is further adapted to control the alert unit to generate the audio alert signal and/or the announcement signal upon determining that the prepaid charges for the communication service have been completely depleted.

It is contemplated that the control unit is further adapted to control and monitor the wireless unit and the memory unit in order to monitor prepayment of the charges for the communication service according to instructions received from a user in response to the alert signal and/or the announcement signal such that the call connection state is maintained and continuous use of the communication service is enabled upon payment of the charges for the communication service. It is further contemplated that the control unit is further adapted to block the call connection state of the wireless communication channel if prepayment of the charges for the communication service is not completed within a predetermined time such that the call connection state is not maintained and continuous use of the communication service is prevented.

It is contemplated that the control unit is further adapted to control and monitor the wireless unit to connect to the selected financial institution via the Internet such that the prepaid charges for the communication service are updated in the memory unit according to information related to the payment request and the payment permission. It is further contemplated that the control unit is further adapted to determine whether the prepaid charges for the communication service have been completely depleted when the communication service is initially accessed.

It is contemplated that the control unit is further adapted to control the alert unit to generate the audio alert signal and/or the announcement signal and to control and monitor the wireless unit and the memory unit in order to establish the Internet connection and facilitate prepayment and charging of the charges for the communication service when it is determined that the prepaid charges for the communication service have been completely depleted. It is further contemplated that the control unit is further adapted to control the wireless unit to inform a user of another mobile communication terminal, with which the terminal is in wireless communication, regarding the hold condition.

In another aspect of the present invention, a method for accessing a communication service in a mobile communication terminal is provided. The method includes determining that a prepaid charge for the communication service has been completely depleted, setting a hold condition for a communication channel related to an ongoing session of the communication service while facilitating prepayment of an additional charge for the communication service and releasing the hold condition for the communication channel upon completion of payment for the additional charge such that a call connection state is maintained and continuous use of the communication service is enabled.

It is contemplated that the method further includes generating at least one of an alert signal and an announcement signal upon determining that the prepaid charge has been completely depleted. It is further contemplated that facilitating prepayment of the additional charge for the communication service further includes processing the prepayment according to instructions received from a user in response to the at least one of an alert signal and an announcement signal.

It is contemplated that the method further includes blocking the communication channel related to an ongoing communication service if prepayment of the additional charge for the communication service is not completed within a predetermined time such that the call connection state is not maintained and continuous use of the communication service is prevented. It is further contemplated that facilitating prepayment of the additional charge for the communication service includes connecting to a financial institution via the Internet.

It is contemplated that facilitating prepayment of the additional charge for the communication service further includes sending a request for the additional charge to the financial institution and receiving a permission for the additional charge from the financial institution. It is further contemplated that setting the hold condition includes informing a user of another mobile communication terminal, with which the terminal is in wireless communication, regarding the hold condition.

Preferably, setting the hold condition includes preventing sending and receiving of communication signals. It is contemplated that determining that the prepaid charge for the communication service has been completely depleted includes subtracting a fee related to previous use of the communication service from a record of the prepaid charge for the communication service. It is further contemplated that facilitating prepayment of the additional charge for the communication service includes adding a fee related to the additional charge for the communication service to a record of the prepaid charge for the communication service.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for providing information that allows the user of the apparatus to determine his or her geographical location relative to another designated geographical location. Although the present invention is illustrated with respect to a mobile communication device, it is contemplated that the present invention may be utilized anytime it is desired to determine one's location in relation to a designated geographical location.

The present invention will be described in detail with reference to the accompanying drawings. Detailed explanation of related functions or constructions may be omitted if they would make objects of the present invention obscure.

Figure 1:
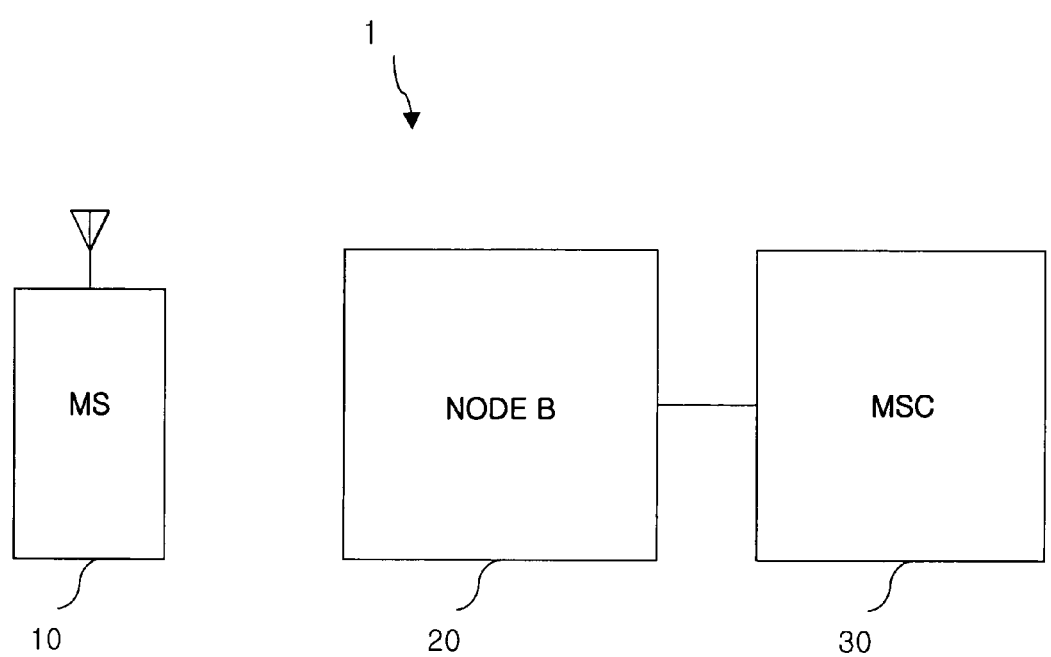
FIG. 1 is a diagram illustrating a mobile communications system according to the present invention.

FIG. 1 is a diagram illustrating a mobile communications system according to the present invention. As illustrated in FIG. 1, a mobile communications system may include a mobile communications terminal 10, or Mobile Station, used for communications within a service area, a base station 20, or Node B, which forms the service area to which the MS is wirelessly connected and a Mobile Switching Center (MSC) 30, which is connected to the Node B and sets a communication path to be connected by a switching operation and controls and monitors overall system operation.

When traveling, it may be inconvenient to carry an MS 10 if the MS has a large size. A Subscriber Identity Module (SIM) card was introduced and adapted to alleviate this inconvenience. The use of the SIM card is one of the features of a mobile communications system based upon a Global System for Mobile communication (GSM) method.

A SIM card includes information related to a communication charge. The SIM card is used to record and manage information required to use mobile communication services, such as user's profile information, financial information, information of a system to which a user is registered and application information.

In a mobile communications system based upon the GSM method, an MS 10 may be rented upon arrival in a place to which a user has traveled and a SIM card carried by the user is coupled to the rented MS. In this way, the user is still able to use a mobile communication service via a home or roaming service.

Figure 2:
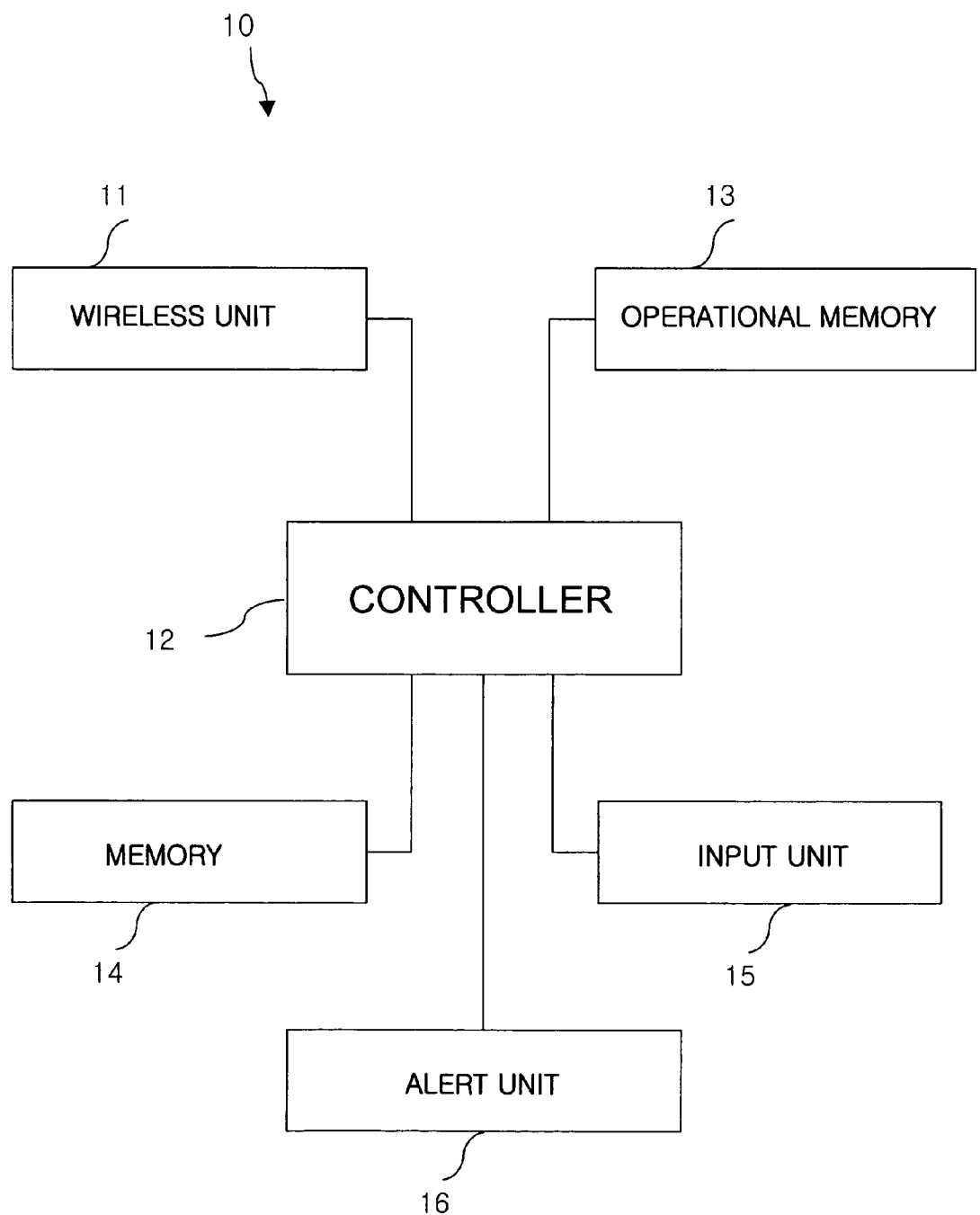
FIG. 2 is a diagram illustrating an apparatus for paying a prepaid communication charge of a mobile communications terminal according to the present invention.

FIG. 2 is a diagram illustrating a construction of an apparatus for paying for a prepaid communication charge of a mobile communication terminal according to the present invention. As illustrated in FIG. 2, an MS 10 may include a wireless unit 11, a controller 12, an operational memory 13, a memory 14, an input unit 15 and an alert unit 16.

The wireless unit 100 sets a hold condition of a communication channel allocated by a base station 20, or Node B, and sends and receives mobile communication signals and signals to request and receive permission for prepayment of communication charges via a wireless connection to a selected financial institution. The controller 110 controls and monitors prepayment, charging and subtracting of charges for communication, connection to Internet, and setting and releasing of the hold condition. The operational memory 120 records and manages various programs and data related to the mobile communications terminal. The memory 130 implements use of a SIM card for recording and managing information related to prepaid communication charges. The input unit 140 facilitates inputting communication signals and control commands related to the Internet connection, payment of communication charges and call control. The alert unit 150 outputs an audio alert signal and announcement message to indicate the depletion of a prepaid communication charge as well as a communication signal.

Figure 3:
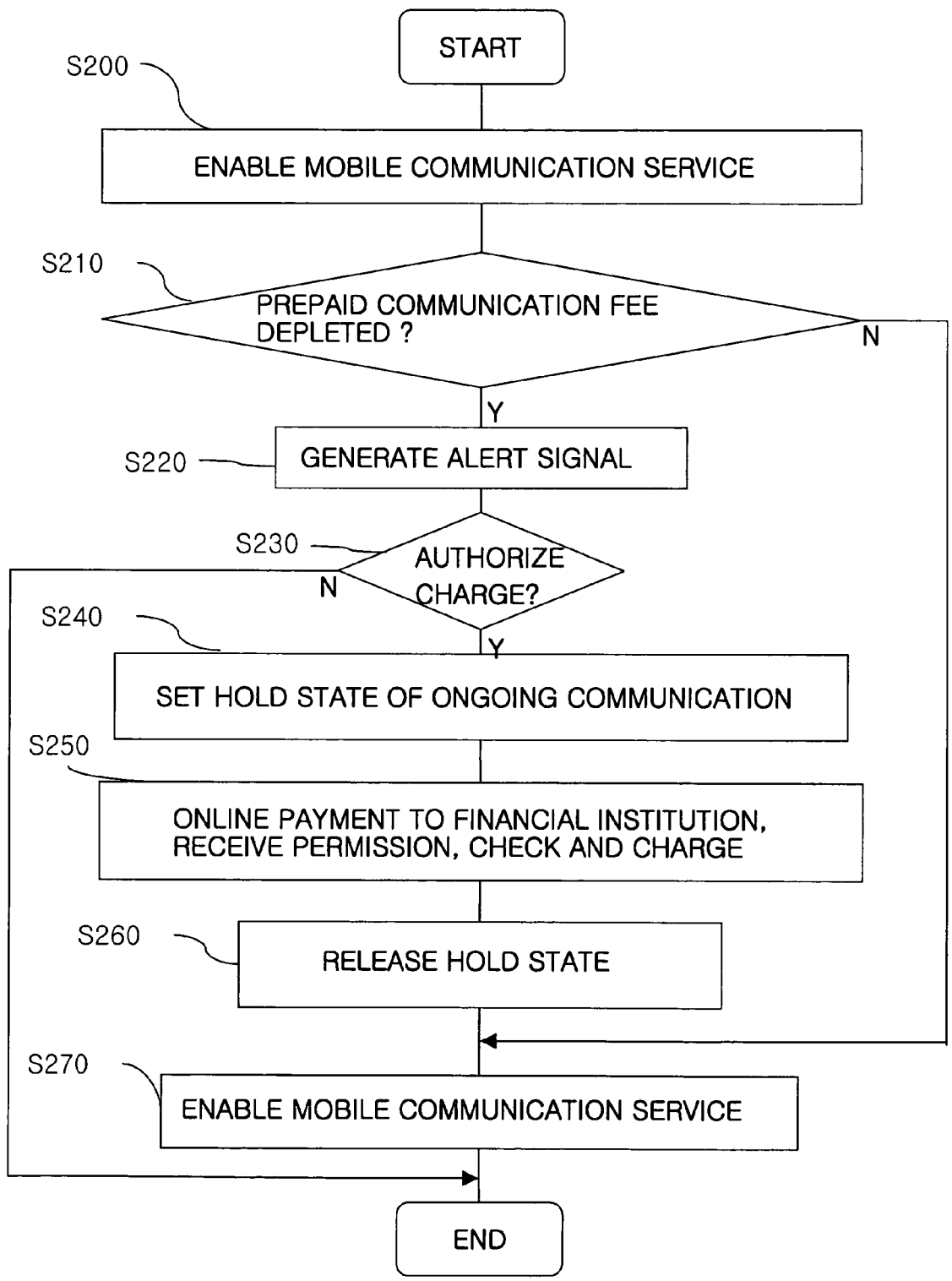
FIG. 3 is a flow chart illustrating a method for paying a prepaid communication charge of a mobile communications terminal according to the present invention.

A method for prepaying communication charges according to the present invention can be implemented such that a fee is prepaid to a corresponding mobile communication service provider and a mobile communication service is then used up to the amount of the fee. Upon completely depleting the prepaid communication fee, the mobile communications terminal generates an alert signal and announcement signal to maintain a current call connection state. Thereafter, the mobile communications terminal is connected to a certain financial institution via a wireless Internet connection in order to facilitate prepayment of an additional fee. Upon payment of the fee, a user is able to continuously use the mobile communication service, which has been in a hold condition for the prepaying operation. FIG. 3 illustrates a method according to the present invention.

Upon applying power to the mobile communications terminal 10, the controller 12 loads an operating program, an application program and operational data, which have been recorded and stored in the operational memory 13, to initialize the mobile communications terminal. The controller 12 monitors each functional unit and analyzes a control command signal applied from the input unit 15.

When it is determined that a user desires to use a mobile communication service, the controller 12 establishes a call connection with another party to use the mobile communication service as long as a prepaid communication charge is not depleted (S200). The controller 12 then reads and analyzes information related to the prepaid communication charge recorded and managed by the memory 14 to determine whether the prepaid communication charge has been completely depleted (S210).

If it is determined that the prepaid communication charge has been completely depleted, the controller 12 controls the alert unit 16 to generate and output an audio alert signal and an announcement message to inform the user of the complete depletion of the prepaid charge (fee) (S220). The alert unit 16 may include a speaker or buzzer to output the audio alert signal and a Liquid Crystal Display (LCD) to output the announcement message using text, images, or video. The speaker also outputs a received communication signal.

The controller 12 then monitors the input unit 15 to verify that the user has input a control command for charging additional prepaid communication fees within a certain set time (S230). When it is verified that the charge control command has been input, the controller 12 maintains an occupied state of the communication channel via which the call is currently connected in order to use the mobile communication service and sets a hold condition to prevent sending and receiving of communication signals (S240).

The hold condition is set such that a wireless channel allocated by the base station 20, or Node B, is maintained in the occupied state by the wireless unit 11 and the sending and receiving of communication signals is prevented. Upon setting the hold condition, for example, the controller 12 can send a message informing another party, with whom the user is currently communicating, of the hold state.

The controller 12 then activates the wireless unit 11 to access the Internet, thereby connecting to a financial institution selected by the user through the input unit 15. The controller 12 controls and monitors a request for prepaying an indicated amount of communication fee selected by the user to the financial institution via the Internet.

When it is verified that a signal for accepting the request for prepayment of the communication fee is received from the financial institution, the controller 12 updates and records information related to the prepaid communication fee in the memory 14 in order to record the prepaid communication fee. After successfully completing the fee payment, the controller 12 releases the hold condition, thereby placing the mobile communication terminal 10 back into a usable state of the mobile communication service (S260).

The controller 12 controls and monitors the wireless unit 11 such that the communication signal applied to the input unit 15 is sent to the other party by outputting the communication signal to the base station 20, or Node B. Additionally, the communication signal sent from the other party is received via the wireless unit 11 and output through the speaker of the alert unit 15 to enable normal use of the mobile communication service.

The wireless unit 11 also receives a charge (fee) signal, which indicates a used fee from the mobile switching center (MSC) 30 and then transfers the received charge signal to the controller 12. The controller 12 analyzes the charge signal and subtracts the used fee indicated by the charge signal from the prepaid communication fee recorded in the memory 14 in order to update fee information in the memory.

Whenever the subtraction and recording of a prepaid communication fee is performed, it is determined whether the prepaid communication fee is completely depleted. If the prepaid communication fee is completely depleted (210), the alert signal and the announcement message signal are generated (S220). If the control command for charging additional prepaid communication fees is not received by the controller 12 within a certain time set by the user, the call connection, which has been maintained in the hold condition, is blocked, thereby preventing use of the mobile communication service.

Additionally, upon first attempting to use the mobile communication service, the controller 12 checks the remaining prepaid communication fee recorded in the memory 14. If it is determined that the prepaid communication fee is completely depleted, the controller 12 generates the alert signal and confirms whether to charge the communication fee prior to enabling the mobile communication service (S200). When it is determined that the user has authorized the charging of additional fees, the controller 12 connects to the designated financial institution through the Internet to perform the charging process for payment of the communication fee and enables use of the mobile communication service (S200).

According to the present invention, when the prepaid communication fee recorded in the memory 14 of the mobile communications terminal 10 is completely depleted, sending and receiving communication signals via the call connection is interrupted and an ongoing mobile communication service is set to a hold condition in which the channel occupied state is maintained. Once the hold condition is set, an Internet connection to a selected financial institution is initiated to request the prepayment of additional communication fees.

After the financial institution accepts prepayment of the communication fee and the communication fee is charged, continuous use of the ongoing mobile communication service is enabled. Furthermore, even when the mobile communication service is not ongoing, a communication fee can be prepaid and charged.

As described herein, the mobile communications terminal and the method for prepaying a communication fee according to the present invention allows a user to continuously use a mobile communication service after authorizing additional fees to be charged. Additionally, the communication fee can easily be recharged by prepayment via a connection to a selected financial institution through the Internet.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalents of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal adapted to access a communication service, the terminal comprising:
    a wireless unit adapted to maintain a call connection state of a wireless communication channel allocated for the communication service and to send and receive payment information via an Internet connection in response to a complete depletion of prepaid charges for the communication service, wherein the payment information is sent to a selected entity configured to facilitate prepayment of charges for the communication service and is related to a payment request and a payment permission for the prepayment of the charges, and wherein the wireless unit is further adapted to set and release a hold condition to maintain the call connection state;
    a memory unit adapted to record information related to the prepayment of the charges for the communication service;
    an alert unit adapted to generate at least one of an audio alert signal and an announcement signal to indicate the complete depletion of prepaid charges for the communication service; and
    a control unit adapted to control and monitor the wireless unit and the memory unit in order to monitor prepayment, control the wireless unit to maintain the call connection state of the wireless communication channel during the hold condition while preventing sending and receiving of communication signals, inform a user of another mobile communication terminal with which the terminal is in wireless communication regarding the hold condition, charge and subtract of the charges for the communication service, establish the Internet connection and set and release the hold condition and further adapted to control the alert unit to generate the at least one of the audio alert signal and the announcement signal.

2. The terminal of claim 1, wherein the memory comprises a Subscriber Identity Module (SIM) card.

3. The terminal of claim 1, wherein the selected entity is a financial institution and wherein the memory is further adapted to record and update information related to the prepaid charges for the communication service which have been accepted by the financial institution and charges related to previous use of the communication service.

4. The terminal of claim 1, wherein the memory unit is further adapted to record information related to a user's profile and information related to operation of a mobile communication system.

5. The terminal of claim 1, wherein the alert unit comprises a speaker adapted to output the communication signal and the audio alert signal under control of the control unit and a display adapted to output a message signal.

6. The terminal of claim 1, wherein the control unit is further adapted to control and monitor subtraction of charges for the communication service recorded in the memory unit in conjunction with a mobile switching center while the communication service is ongoing.

7. The terminal of claim 1, wherein the control unit is further adapted to determine whether the prepaid charges for the communication service have been completely depleted while the communication service is ongoing.

8. The terminal of claim 7, wherein the control unit is further adapted to control the alert unit to generate the at least one of the audio alert signal and the announcement signal upon determining that the prepaid charges for the communication service have been completely depleted.

9. The terminal of claim 8, wherein the control unit is further adapted to control and monitor the wireless unit and the memory unit in order to monitor the prepayment of the charges for the communication service according to instructions received from a user in response to the at least one of the alert signal and the announcement signal such that the call connection state is maintained and continuous use of the communication service is enabled upon payment of the charges for the communication service.

10. The terminal of claim 9, wherein the control unit is further adapted to block the call connection state of the wireless communication channel if the prepayment of the charges for the communication service is not completed within a predetermined time such that the call connection state is not maintained and continuous use of the communication service is prevented.

11. The terminal of claim 1, wherein the selected entity is a financial institution and wherein the control unit is further adapted to control and monitor the wireless unit to connect to the selected financial institution via the Internet such that the prepaid charges for the communication service are updated in the memory unit according to information related to the payment request and the payment permission.

12. The terminal of claim 1, wherein the control unit is further adapted to determine whether the prepaid charges for the communication service have been completely depleted when the communication service is initially accessed.

13. The terminal of claim 12, wherein the control unit is further adapted to control the alert unit to generate the at least one of the audio alert signal and the announcement signal and to control and monitor the wireless unit and the memory unit in order to establish the Internet connection and facilitate prepayment and charging of the charges for the communication service when it is determined that the prepaid charges for the communication service have been completely depleted.

14. A method for accessing a communication service in a mobile communication terminal, the method comprising:
    determining that a prepaid charge for the communication service has been completely depleted;
    setting a hold condition for a communication channel to maintain an ongoing session of the communication service and facilitate prepayment of an additional charge for the communication service in response to the determination that the prepaid charge has been completely depleted,
    wherein setting the hold condition comprises informing a user of another mobile communication terminal with which the terminal is in wireless communication regarding the hold condition and preventing sending and receiving of communication signals; and
    releasing the hold condition for the communication channel upon completion of payment for the additional charge such that a call connection state is maintained and continuous use of the communication service is enabled.

15. The method of claim 14, further comprising generating at least one of an alert signal and an announcement signal upon determining that the prepaid charge has been completely depleted.

16. The method of claim 15, wherein facilitating prepayment of the additional charge for the communication service further comprises processing the prepayment according to instructions received from a user in response to the at least one of an alert signal and an announcement signal.

17. The method of claim 14, further comprising blocking the communication channel related to an ongoing communication service if prepayment of the additional charge for the communication service is not completed within a predetermined time such that the call connection state is not maintained and continuous use of the communication service is prevented.

18. The method of claim 14, wherein facilitating prepayment of the additional charge for the communication service comprises connecting to a financial institution via the Internet.

19. The method of claim 18, wherein facilitating prepayment of the additional charge for the communication service further comprises sending a request for the additional charge to the financial institution and receiving a permission for the additional charge from the financial institution.

20. The method of claim 14, wherein determining that the prepaid charge for the communication service has been completely depleted comprises subtracting a fee related to previous use of the communication service from a record of the prepaid charge for the communication service.

21. The method of claim 14, wherein facilitating prepayment of the additional charge for the communication service comprises adding a fee related to the additional charge for the communication service to a record of the prepaid charge for the communication service.

* * * * *